June 23, 1959  H. E. IDOINE ET AL  2,891,814
TONGS
Filed June 4, 1956

INVENTORS
HARRY E. IDOINE
ERWIN M. RILEY
BY ROBERT B. IDOINE

Christie, Parker & Hale
ATTORNEYS

United States Patent Office 2,891,814
Patented June 23, 1959

2,891,814

TONGS

Harry E. Idoine, Compton, Calif., Erwin M. Riley, Phoenix, Ariz., and Robert B. Idoine, Norwalk, Calif.

Application June 4, 1956, Serial No. 589,282

7 Claims. (Cl. 294—99)

This invention relates to tongs having a plurality of pairs of jaws. The tongs are particularly useful for use in holding thin flat foods such as tortillas.

The tongs may be used for various purposes, such as the handling of heated material, or material which is to be heated. The jaws of the tongs are particularly adapted to grasp folded objects. Of the many purposes for which these tongs may be utilized, one example is described herein.

In the making of tortillas for tacos, a variety of ingredients such as flour, milk, salt, etc. are mixed to form a dough and then rolled out flat. The flat dough is cut in pieces of the desired shape and proper size, folded over on itself and cooked in oil or other shortening. The dough is cooked until it becomes well done at which time it is removed and the oil or other shortening allowed to drain off the tortilla. Once dried, the tortilla may be filled with prepared food and served. This is called a taco. The usual practice is to hold the loose ends of a tortilla together by means of a toothpick. The utensil disclosed herein provides a simple and easy way of forming a tortilla and holding it in shape while being cooked.

The tortilla is formed and fried by utilizing a plurality of jaws. The tortilla is first folded and placed in the jaws. The jaws are biased in such a manner as to grasp and hold firmly the edges of the folded tortilla. The tongs are then placed in a cooking vessel, such as a skillet, and the tortilla fried. A manual force exerted against the jaw biasing means releases the fried tortilla. The tortilla is now ready for receiving the ingredients used in making the taco. Means are provided in the handle of the tongs for resting the tongs on the edges of the cooking vessel. Also, extension members are provided, which extend beyond the leading edges of the jaws to prevent the folded portion of the tortilla from touching the sides or bottom of the skillet.

A better understanding of the present invention and its advantages may be had upon a reading of the following detailed description when taken in connection with the drawings, in which.

Figure 1:
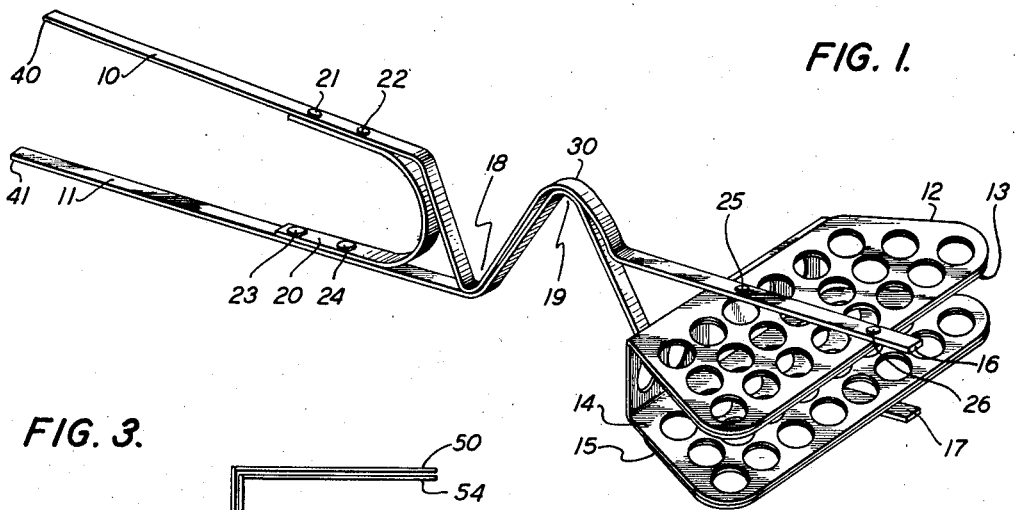
Fig. 1 is a perspective view showing a preferred embodiment of the new tongs.

Referring to the figures, a pair of elongated members 10 and 11 are provided forming handles. The elongated members 10 and 11 may be in the shape of elongated flat bars, as shown, or any other shape which provides for easy handling of the utensil. Provided between a portion of flat bars 10 and 11 are a plurality of jaws 12, 13, 14 and 15. A plurality of holes may be provided in each of the jaws so that greases and oils may flow through the holes and not saturate the tortilla which is being cooked.

Jaw 12 is connected to the flat bar 10 at points longitudinally spaced from the extremity of the flat bar 10, thereby providing an extension 16. Jaw 15 is attached to the bar 11 at points longitudinally spaced from the extremity of bar 11, thus providing an extension member 17. The extension members 16 and 17 prevent the folded portion of the tortilla from coming into contact with the vessel in which the tortilla is being fried. The tortilla is protected by extensions 16 and 17 from engaging the sides of a pot or pan while it is soft and pliable and, therefore, retains its shape during the cooking process.

A first V-bend 18 is formed in the flat bar 10. A second V-bend 19 is formed in the flat bar 11. The apexes of the V-bends 18 and 19 face in opposite directions. The function of V-bends 18 and 19 is to enable the handler to rest the utensil upon the edge of the vessel in which the tortilla is being fried. By this means, half of the tortilla is positioned as close to the bottom of the pan as possible, requiring a minimum of oil in the pan. When the first half of the tortilla is fried, the utensil is turned over and the other half fried. Two V-bends are provided so that the utensil may be turned on either side and still be rested upon or near the bottom of the cooking vessel. Because the spacing between bars 10 and 11 is less on one side of the V-bends than on the other side, and the depth of each V-bend is substantially the same, a rounded portion 30 of bar 10 is provided to receive V-bend 19.

Figure 2:
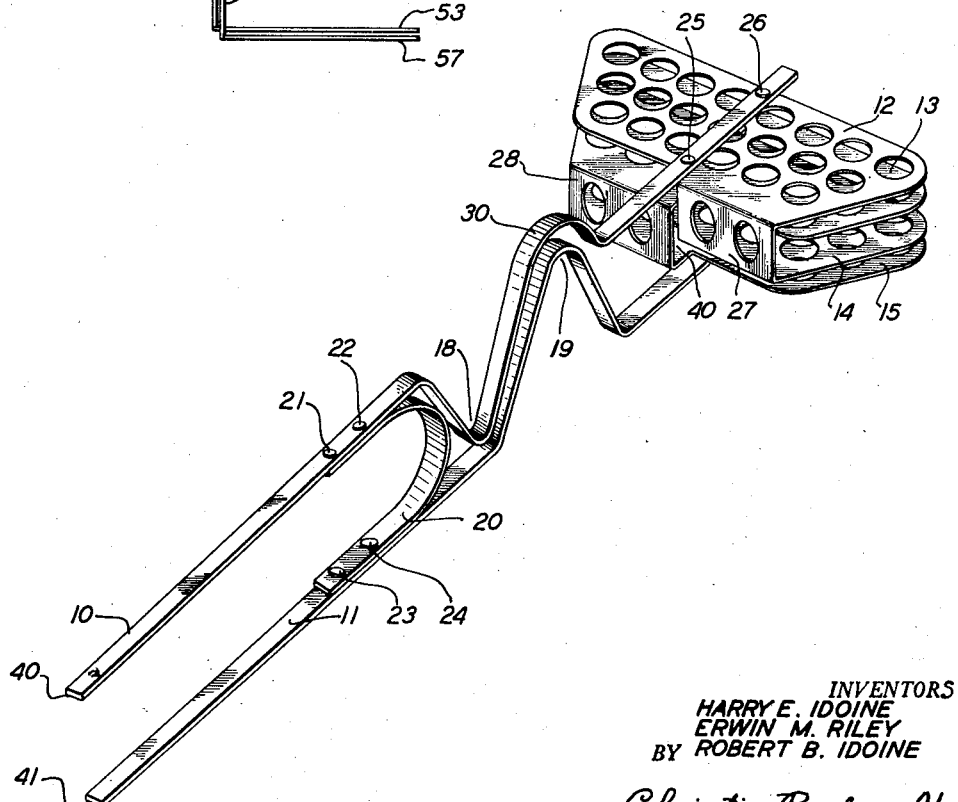
Fig. 2 is a perspective view showing the tongs in the open position for removal of the heated material.

The manner in which the jaws may be interconnected is shown in Fig. 2 wherein the jaws are shown in the separated position, permitting the easy removal of the fried tortilla. Jaws 12 and 14 are interconnected by a jaw-connecting plate 27. The jaw-connecting plate 27 is perpendicular to the jaws 12 and 14 so that jaws 12 and 14 are in parallel arrangement and separated a fixed distance. A second jaw-connecting plate 28 is connected to jaws 13 and 15. Jaw-connecting plate 28 is perpendicular to jaws 13 and 15 so that jaws 13 and 15 are parallel to one another and also spaced apart by a fixed distance. Holes may be provided in the jaw connecting plates 27 and 28 to permit the flow of greases or oils.

The jaw-connecting plate 27 is located on one side of the flat bars 10 and 11, and jaw-connecting plate 28 is located on the other side of bars 10 and 11, with a space 40 being provided between them to prevent friction upon movement of the jaw-connecting plates. It is seen, therefore, that jaw-connecting plates 27 and 28 are laterally offset, one from the other. By such an arrangement a first pair of jaws 12 and 14 and a second pair of jaws 13 and 15 are provided, with jaw 13 being disposed between jaws 12 and 14, and with jaw 14 being disposed between jaws 13 and 15.

To bias jaw 13 against jaw 12, and jaw 14 against jaw 15, a spring 20 is positioned between the bars 10 and 11. Spring 20 may be a flat spring which is bent in the shape of a U. The flat spring 20 has one end thereof connected to bar 10 and the other end thereof connected to bar 11, with the folded portion, or apex, of the flat spring 20 facing towards the V-bends 18 and 19. Flat spring 20 may be connected to the bars 10 and 11 by any conventional coupling means such as rivets 21, 22, 23 and 24.

Flat spring 20 functions as a biasing means for biasing one side of the bars 10 and 11 apart, and for biasing the other side of bars 10 and 11, including the jaws, toward one another. Spring 20 also acts as a fulcrum or pivot about which the flat bars 10 and 11 can be pivoted against the bias of the spring 20 to separate jaw 12 from jaw 13 and jaw 14 from jaw 15, enabling the handler to easily release the completed tortilla.

The jaws 12, 13, 14 and 15 may have the same physical dimensions and may be mounted on the bars 10 and 11 so that their leading edges are lying along the same plane, and their geometrical centers are aligned. Jaw 12 is connected to the bar 10 by means of any conventional coupling means such as rivets 25 and 26. Jaw 15 is connected to bar 11 by rivets (not shown).

Figure 3:
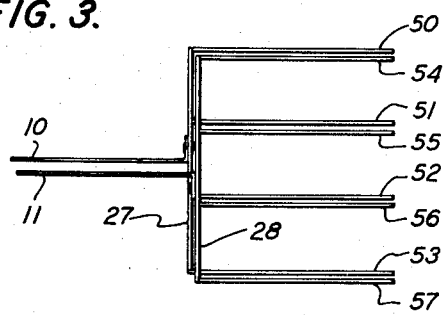
Fig. 3 is a perspective view of the jaws showing how the pairs of jaws may be extended to substantially any number.

Fig. 3 shows the jaw portion of an embodiment utilizing four pairs of jaws to enable the handling of a plurality of solid materials simultaneously. In this embodiment, flat bars 10 and 11 are slightly spaced horizontally and attached to the jaw-connecting plates 27 and 28, respectively. Connected to jaw-connecting plate 27 are jaws 50, 51, 52 and 53 in parallel. Connected to jaw-connecting plate 28 are jaws 54, 55, 56 and 57 in parallel. Hence, two pieces of folded material can be handled simultaneously. Clearly, the number of pairs of jaws can be increased to any desired number by extending connecting members 27 and 28 and connecting additional jaws thereto.

Cylindrical elongated members may be substituted for the flat bars 10 and 11. Also, in place of the U-shaped spring 20 a sear spring could be positioned between the extremities 40 and 41 of elongated members 10 and 11.

We claim:

1. A set of tongs comprising a first pair of jaws and a second pair of jaws, laterally offset members separately connecting the jaws of each pair so that a first jaw of the first pair is disposed between the jaws of the second pair and a first jaw of the second pair is disposed between the jaws of the first pair, handle means separately connected to the second jaw of each pair of jaws, and spring means for yieldably biasing each jaw of the first pair of jaws against a different jaw of the second pair of jaws.

2. A set of tongs comprising a pair of pivoted elongated members each having a bent portion thereof adapted to rest upon a cooking vessel, a pair of spaced jaws connected to each elongated member and movable therewith, laterally offset means interconnecting the jaws of each pair so that one jaw in each pair of jaws is disposed between the other pair of jaws, and resilient means for biasing each jaw of one pair of jaws against a different jaw of the other pair of jaws.

3. A set of tongs comprising a pair of pivoted elongated members each having a substantially V-shaped bent portion, the apexes of said V-shaped bent portions facing in opposite directions, a first pair of jaws and a second pair of jaws, a first jaw of each pair being connected to a separate elongated member so that the leading edge of the jaw is at a point longitudinally spaced from the end of said member, thereby providing a pair of extension members, laterally offset members separately connecting the jaws of each pair so that the second jaw of each pair of jaws is disposed between the jaws of the other pair, and resilient means for separately biasing first and second jaws of different pairs of jaws against each other.

4. A set of tongs comprising a pair of elongated members each having a substantially V-shaped bent portion, the apexes of said V-shaped bent portions facing in opposite directions, a first pair of jaws and a second pair of jaws, a first jaw of each pair being connected to a separate elongated member so that the leading edge of the jaw is at a point longitudinally spaced from one end of the elongated member, thereby providing a pair of extension members, jaw-connecting members joining the first and second pairs of jaws respectively, the jaw-connecting members being laterally offset to position the second jaw of each pair of jaws between the jaws of the other pair, and a spring positioned longitudinally between the V-shaped bent portions and the other end of the elongated members, said spring separately biasing first and second jaws of different pairs of jaws against each other and serving as a fulcrum for forces applied adjacent said other end of the elongated members.

5. A set of tongs in accordance with claim 4 wherein the spring consists of a flat spring bent in the form of a U with one end thereof being connected to one elongated member and the other end thereof being connected to the other elongated member and the vertex facing toward the V-shaped bends.

6. A set of tongs comprising a pair of spaced apart elongated flat bars located in substantially the same plane, each bar having a substantially V-shaped bend at a point spaced from a first extremity of the bar, the sides of the V-shaped bend in each elongated flat bar extending toward the other elongated flat bar and a side of one bend being adjacent to a side of the other bend; a flat spring disposed between the bars and bent in the form of a U with its ends separately joined to the bars at points respectively located longitudinally between each V-shaped bend and the first extremity of each elongated flat bar, the apex of the spring facing toward the V-shaped bends, said spring thereby serving to bias the flat bars away from one another on one side of the spring and toward one another on the other side thereof; a first jaw connected to one elongated flat bar between the V-shaped bends and the second extremity of the elongated flat bar and on the side of the flat bar facing the other flat bar; a first jaw-connecting plate perpendicularly connected to the back edge of said jaw; a second jaw connected to the jaw-connecting plate in parallel with the first jaw so as to be movable with said first jaw; a third jaw connected to the other elongated flat bar on the side facing the first flat bar, said third jaw being parallel to the first and second jaws; a second jaw-connecting plate of substantially the same size as the first jaw-connecting plate perpendicularly connected to the back edge of said third jaw and laterally offset from the first jaw-connecting plate; and a fourth jaw connected to the second jaw-connecting plate in parallel with the third jaw so as to be movable with said third jaw, said fourth jaw being disposed between the first and second jaws and said second jaw being disposed between the third and fourth jaws, the front edges of the four jaws lying substantially in a plane perpendicular to the bars, so that the first and fourth jaws, and the second and third jaws are biased against one another by said spring, the application of a force against the bias of said spring acting to separate said jaws.

7. A set of tongs comprising a first jaw-connecting member and a second jaw-connecting member, the first jaw-connecting member being laterally offset from the second jaw-connecting member; an equal plurality of jaws separately supported by each jaw-connecting member; handle means separately connected to each of the jaw-connecting members; and means for yieldably biasing each jaw supported by the first jaw-connecting member against a different jaw supported by the second jaw-connecting member.

References Cited in the file of this patent

UNITED STATES PATENTS 2,024,849      Eliopoulos _____ Dec. 17, 1935